Sept. 19, 1961  B. H. MOSBACHER  3,000,479
ELECTROMAGNETIC CLUTCH

Filed June 23, 1958  2 Sheets-Sheet 1

Inventor
Bruce H. Mosbacher
By McCanna, Morsbach & Pillote
Atty's

Sept. 19, 1961 B. H. MOSBACHER 3,000,479
ELECTROMAGNETIC CLUTCH
Filed June 23, 1958 2 Sheets-Sheet 2
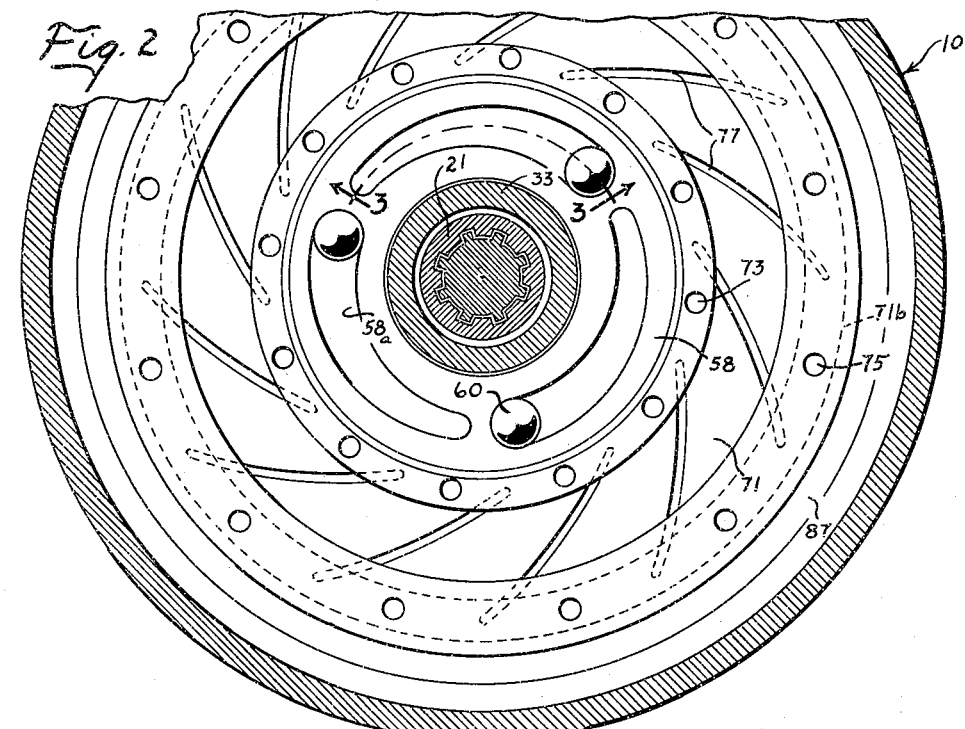
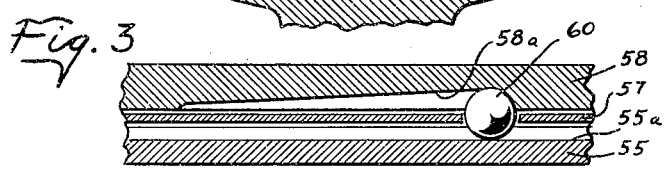
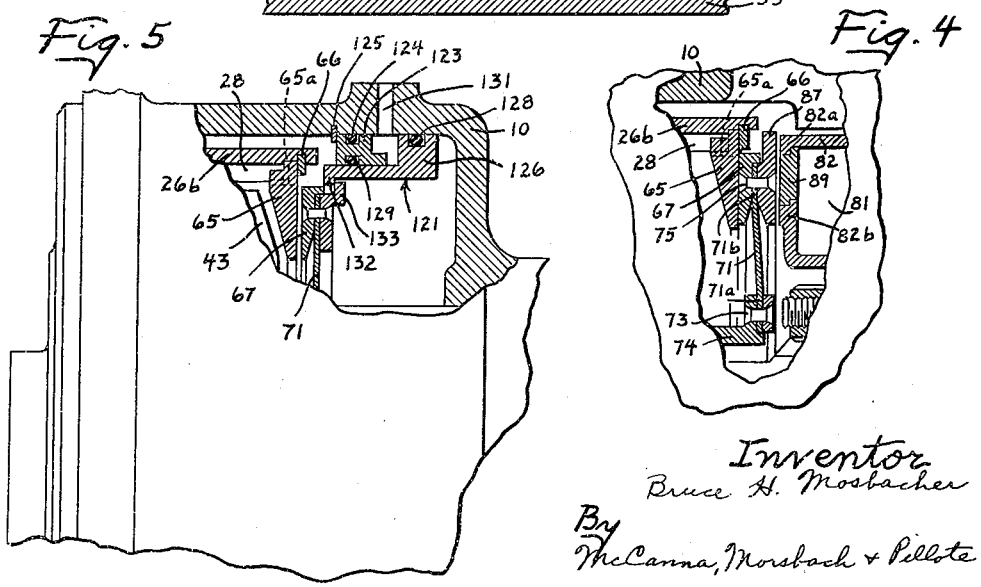
Inventor
Bruce H. Mosbacher
By
McCanna, Morsbach & Pellote
Atty's United States Patent Office 3,000,479
Patented Sept. 19, 1961

3,000,479
ELECTROMAGNETIC CLUTCH
Bruce H. Mosbacher, Rockford, Ill., assignor to Roper Hydraulics, Inc., Rockford, Ill., a corporation of Illinois
Filed June 23, 1958, Ser. No. 743,906
12 Claims. (Cl. 192—35)

This invention relates to clutch mechanisms and particularly to a multiple disk clutch of the type including a main clutch and a pilot clutch for operating the main clutch.

An important object of this invention is to provide a multiple disk clutch mechanism having an improved pilot clutch operating mechanism for selectively effecting engagement and disengagement of the main clutch and which is so arranged as to prevent erratic operation of the main clutch after disengagement of the pilot clutch or when the direction of rotation of the main clutch input shaft is reversed.

A more particular object of this invention is to provide a multiple disk clutch apparatus including a main clutch and a pilot clutch wherein the pilot clutch is normally operative to effect engagement of the main clutch and which has a stationary pilot clutch actuator for selectively disengaging the main clutch.

A further object of this invention is to provide a multiple disk clutch including a main clutch, a force multiplying apparatus having a rotary cam actuator for moving the main clutch elements into coacting engagement and a pilot clutch member non-rotatably mounted on the rotary cam actuator for limited axial movement and normally yieldably urged into coacting engagement with the main clutch input member to effect engagement of the main clutch.

Still another object of this invention is to provide a clutch mechanism which is adapted for operation at high speed and which is compact in construction and light in weight.

Yet another object of this invention is to provide a clutch including a first set of bearings operative when the clutch is disengaged to permit relative rotation between the input and output members and a second set of bearings operative when the clutch is engaged, together with an improved lubrication system for lubricating the first and second sets of bearings and which is automatically operative to decrease the flow of lubricant to the first set of bearings and increase the flow of lubricant to the second set of bearings when the clutch is engaged.

These, together with various ancillary objects and advantages of this invention will be more readily appreciated as the same becomes better understood by reference to the following detailed description when taken in connection with the accompanying drawings wherein:

FIG. 2 is a fragmentary sectional view through the clutch mechanism taken on plane 2—2 of FIGURE 1;

FIG. 3 is a fragmentary sectional view through the ball type force multiplying mechanism taken on the plane 3—3 of FIG. 2;

FIG. 4 is a fragmentary view of the clutch with parts broken away and illustrating the same in its normally engaged position, and FIG. 5 is a fragmentary view of a modified form of clutch with parts broken away and illustrating an hydraulic type pilot clutch actuator.

Figure 1:
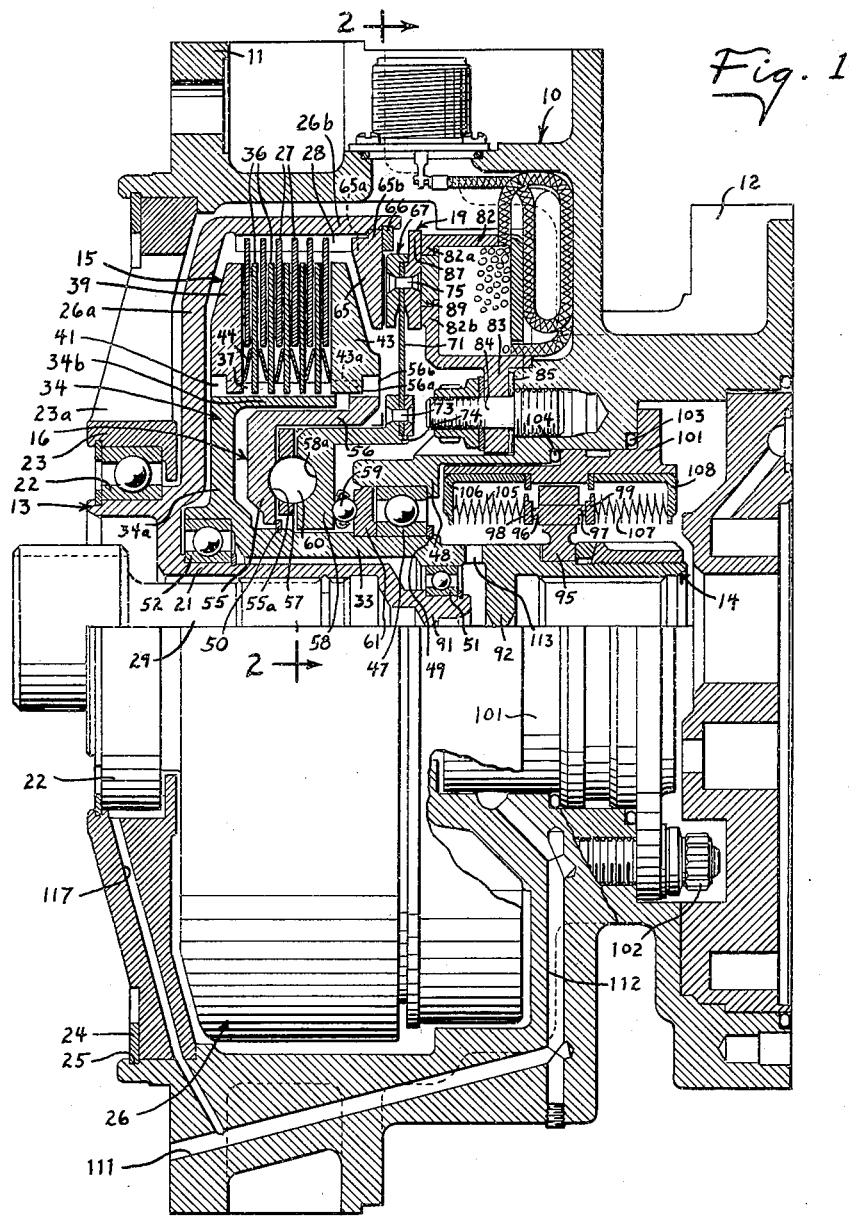
FIGURE 1 is a view of the clutch apparatus with the housing broken away and with the clutch mechanism shown partially in longitudinal section and partially in elevation.

The clutch apparatus is enclosed in a housing 10 and, in the embodiment herein illustrated, has a flange 11 on one end for attaching the clutch to the drive apparatus and a flange 12 at the other end for connecting the same to the driven apparatus. The clutch also includes input and output members 13 and 14 respectively mounted on the housing for relative rotation therebetween, a main clutch apparatus 15 for driving interconnecting the input and output members, a force multiplying mechanism 16 for moving the clutch elements of the main clutch into coacting engagement, and a pilot clutch 19 for operating the main clutch through the aforementioned force multiplying mechanism.

The input member 13 includes a hollow shaft portion 21 which is non-slidably and rotatably supported at the outer end thereof by means of a bearing 22 carried by the end wall 23 on the housing 10. As will be noted, the end wall 23 is removably received in the end of the housing to enable assembly and disassembly of the clutch parts therein and is retained in position by a split ring 24 received in a groove 25 in the housing. The input member 13 also includes a cage 26 having a generally radial wall portion 26a extending outwardly from the shaft 21, at a point inwardly of the bearing 22, and a substantially cylindrical wall portion 26b extending from one side of the wall portion 26a. A first set of main clutch elements 27, herein shown six in number are slidably and non-rotatably mounted on the cage 26 as by engagement with inwardly extending spline teeth 28 thereon. As is conventional, the clutch elements 27 have clutch surfaces on opposite sides thereof. The input member is operatively connected to a drive apparatus (not shown) by a drive shaft 29 having the inner end thereof splined to the shaft portion 21 internally of the latter.

The ouput member 14 includes a hollow shaft portion 33 and a cage 34 including a generally radially extending wall 34a disposed adjacent the wall 26a and a cylindrical wall 34b spaced radially from the wall portion 26b and from the shaft 33. A second set of clutch elements 36 are slidably and non-rotatably attached to the cage 34, as by spline teeth 37 and are interposed between the clutch elements 27 on the input member to effect driving engagement therebetween when the clutch elements are pressed into coacting engagement. An end plate 39 is non-slidably and non-rotatably connected to the cage 34 and is herein shown non-rotatably keyed to the cage by the spline teeth 37 and the constrained against axial movement by the outwardly extending projection 41 at one end of the spline teeth 37. A main clutch operating plate 43 has spline teeth 43a formed on the inner periphery thereof and which slidably and non-rotatably engage the spline teeth 37 for rotation with the cage 34 and for axial movement relative thereto selectively move the interleaved clutch elements 27 and 36 into coacting engagement. Resilient generally cup-shaped spring elements 44 are interposed between the adjacent clutch elements 36 and between the end clutch elements and the plates 39 and 43 to normally urge the clutch elements 36 and 27 out of coacting engagement. As will be noted, the position of alternate cup springs 44 is reversed so as to prevent tilting of the clutch elements 27.

The shaft 33 of the output member is rotatably supported by a bearing 47 on a re-entrant portion 48 of the housing 10 and a split ring 49 is disposed in a groove in the shaft 33 and engages the inner race of the bearing 47 to limit axial movement of the same relative to the shaft. Antifriction bearings 51 and 52 are interposed between the shaft 21 and the shaft 33 to rotatably interconnect the same and support the input and output shafts on the housing.

In accordance with the present invention, the force multiplying apparatus 16 is disposed radially inwardly of the main clutch 15 to minimize the centrifugal force on the ball type actuators and also axially inwardly of the main clutch to provide a more compact overall assembly. In particular, the force multiplying mechanism includes a plate 55 disposed radially inward of the cylindrical portion 34b of the cage 34, and which plate is non-slidably and non-rotatably connected through a sleeve portion 56 to the clutch operating plate 43. In the embodiment herein illustrated the clutch operating plate 43 is formed separate from the sleeve 56 and the spline teeth 43a thereon non-rotatably engage the complementary spline teeth 56a on the sleeve. Outwardly extending projections 56b are provided on one end of the teeth 56a and engage the operating plate 43 to move the same in a direction to press the clutch plates 27 and 36 into coacting engagement when the plate 55 is moved to the left, as viewed in FIGURE 1. As previously described, the spring elements 44 separate the clutch disks and move the main clutch operating plate 43 to the right as viewed in FIGURE 1. A split ring 50 is disposed in a groove in the output shaft 33 and positioned to engage the plate 55 to limit movement of the operating plate 43, for a reason to be described more fully hereafter.

The plate 55 has a continuous annular ball groove 55a formed therein and a plurality of balls, herein shown three in number, are disposed in the groove and annularly spaced apart by means of a retainer ring 57. An annular cam plate 58 is mounted for rotation relative to the plate 55 and output member 14 and is constrained against axial movement relative thereto. The cam plate 58 has annular ball cam races 58a formed therein which receive the balls 60 and urge the latter axially to the left as viewed in FIGURE 1 when the cam plate 58 is rotated relative to the shaft. In particular, the cam plate 58 is radially supported by the balls 60 and an antifriction thrust bearing 59 interposed between the cam member and the thrust bearing race 61. The latter is non-slidably supported on the shaft 33 and abuts against the inner race of the antifriction bearing 47, which inner race, as previously described, is constrained against axial movement by the split ring 49. The cam member 58 is preferably arranged to effect movement of the operating plate 43 in a direction to press the main clutch disks into coacting engagement, in response to rotation of the cam plate relative to the output member in the direction of rotation of the input member. The input member is arranged for clockwise rotation and, as shown in FIG. 2, the ball cam tracks 58a are arranged to effect locking movement of the clutch operating member in response to clockwise rotation of the cam plate.

The pilot clutch 19 is arranged to selectively connect and disconnect the ball cam actuator from the input member 13. In accordance with the present invention, the pilot clutch 19 includes a first annular clutch member 65 which is non-slidably and non-rotatably connected to the outer end of the cage 26 for rotation therewith. In the particular embodiment illustrated, the clutch member 65 has spline teeth 65a formed therein which non-rotatably engage the spline teeth 28 on the cylindrical portion 26b of the input cage. The pilot clutch member 65 has outwardly extending projections 65b on one end of the teeth 65a which are retained in abutting relation to a shoulder on the end of the cylindrical portion 26b by means of a split ring 66. The other member of the pilot clutch 19, herein designated by the numeral 67, is non-rotatably attached to the cam actuator 58 and supported thereon for limited axial movement into and out of engagement with the clutch member 65.

The pilot clutch member 67 is advantageously attached to the cam actuator 58 by a resilient disk type spring 71, which spring is arranged to normally urge the clutch member 67 into coacting engagement with the clutch member 65 to thereby normally effect engagement of the main clutch. The disk spring 71, as best shown in FIG. 4, includes a radially inner portion 71a which is disposed parallel to and axially offset from the radially outer portion 71b. The inner portion is attached, as by rivets 73 to the flanged end of an axially extending sleeve 74 attached to the ball cam actuator 58. The pilot clutch member 67 is disposed along one side of the radially outer portion 71b and is attached to the spring 71 as by rivets 75. As best shown in FIG. 2, the disk spring 71 has a plurality of annularly spaced spiral slots 77 formed therein and which terminate inwardly of the radially inner and outer edges thereof to facilitate flexing movement of the disk type spring 71 as the pilot clutch member 67 moves from its engaged position shown in FIG. 4 to its disengaged position shown in FIGURE 1. As shown herein the slots 77 spiral outwardly in a clockwise direction, that is the direction of rotation of the pilot clutch member 67 to effect engagement of the main clutch.

In the embodiment of FIGURES 1–4, the pilot clutch 19 is solenoid operated to its disengaged position and for this purpose a stationary solenoid 81 is disposed within a casing 82, which casing has inwardly extending lugs 83 attached as by studs 84 to the clutch casing 10. Washers 85 are interposed between the ears 83 and the clutch casing 10 to adjust the position of the solenoid and thereby adjust the air gap between the solenoid and the armature 87 attached to the pilot clutch member 67, when the solenoid is de-energized. The solenoid is shaped to define pole pieces 82a and 82b separated by a ring 89 of non-magnetic material. When energized, the solenoid establishes a magnetic path through the pole pieces 82a and 82b and the armature 87 to thereby attract the same to the electromagnet and effect disengagement of the pilot clutch.

The hollow input shaft 21 is closed at the inner end thereof by means of a wall 91 and the generally hollow output shaft 33 is closed intermediate the ends thereof by a wall 92. In accordance with the present invention, provision is made for sealing the interface between the output shaft 33 and the housing 10 to prevent leakage of lubricant from the housing. The particular clutch illustrated is also arranged for driving a pump and conveniently, the seal for preventing leakage of the fluid being pumped may also be interposed between the output shaft and the housing. In particular, the seal includes a rotary seal member 95 having a double seal face 96 and 97 at opposite sides thereof. The rotary seal member is non-slidably and non-rotatably connected to the output shaft and opposed stationary seal members 98 and 99 are positioned in close running fit with the seal faces 96 and 97. The double seal is enclosed in an annular seal casing 101 which is detachably secured to the clutch housing 10, as by fasteners 102 and which is sealed thereto as by rings 103 and 104. The stationary seal 98 is yieldably urged against the rotary seal face 96 by a bellows 105, which bellows is otherwise attached to an annular flanged ring 106 carried by the seal casing 101. The stationary seal member 99 is similarly connected to a bellows 107 attached to a flanged retainer ring 108 also carried by the seal casing. As is apparent, the stationary seal 99 and the rotary seal face 97 form a running seal between the shaft and clutch housing to prevent the leakage of the fluid pumped by the driven apparatus therebetween, and the space outwardly of the bellows 107 is communicated to atmosphere through a suitable drain passage (not shown). The stationary seal 98 and rotary seal face 96 are arranged to prevent the leakage of lubricant from the clutch housing around the output shaft.

In order to enable operation at high speeds, the clutch mechanism is not immersed in lubricant but is instead lubricated through a spray type system. For this purpose, lubricant is supplied to the clutch housing at a point adjacent the seal casing 101 and inwardly of the seal 104. As shown in FIGURE 1, lubricant under pressure is supplied from lubricant supply of the drive apparatus (not shown) through passages 111 and 112 formed in the clutch housing 10, which last-mentioned passage opens at a point around the seal casing 101 and inwardly of the seal ring 104. When the clutch is disengaged, the lubricant flows into the chamber within the diaphragm 105, a portion of the lubricant flowing past bearing 47 and thrust bearings 59 to the balls 60 to lubricate the same, and the other portion of the lubricant flowing through radial ports 113 formed in the output shaft 33 and past bearings 51 and 52. The lubricant from the clutch housing returns to the lubricant supply source in the drive apparatus through the openings 23a in the end wall 23 thereof. Lubricant is also supplied through a passage 117 to the bearing 22 which supports the input member on the end wall 23.

As previously described, when the main clutch is disconnected, the output shaft 33 is stationary and the lubricant flows through the port 113 therein and lubricates the bearings 51 and 52 which are active at this time. When the main clutch is engaged, as shown in FIG. 4, the output member or shaft 33 rotates in unison with the input shaft 21 so that the bearings 51 and 52 are inactive at that time. However, the centrifugal force due to the rotation of the output shaft 33 opposes the flow of lubricant through the ports 113 so that the entire lubricant supply from passages 111 and 112 is diverted through and past the bearings 47, 59 and 60 and does not flow past bearings 51 and 52.

A modified form of clutch is illustrated in FIG. 5. In general, the clutch of FIG. 5 is the same as that shown in FIGURES 1–4 with the exception of the provision of an hydraulic type actuator 121 in lieu of the electromagnet 81 illustrated in FIGURES 1–4. The hydraulic actuator illustrated in FIG. 5 employs a stationary seal ring 123 which is sealed to the housing by an O-ring 124 and constrained against sliding movement by a split ring 125. An annular piston 126 having a generally L-shaped cross-section is disposed within the housing and sealed to the housing and to the ring 123 by O-rings 127 and 128. Fluid under pressure is selectively applied to the piston 126 through a port 131 in the housing and the piston has a finger 132 formed thereon and arranged to engage an annular flanged member 133 attached to the pilot clutch member 67, to selectively move the same to its disengaged position shown in FIG. 5. When the fluid pressure applied to the piston is released, the disk spring is operative to return the pilot clutch member 67 to its engaged position.

The operation of the clutch, while apparent from the foregoing description, is briefly summarized as follows. The disk spring 71 normally moves the pilot clutch member 67 into engagement with the pilot clutch member 65 carried by the main clutch input member 13. The pilot clutch member 67 therefore normally drives the cam actuator 58 with the input member. Assuming that the main clutch is disengaged, the cam actuator will be turned relative to the cam plate 55 during a portion of a revolution until the balls roll in the cam groove 58a and move the plate 55 to the left as viewed in FIGURE 1. This moves the main clutch operator plate 43 into its engaged position and effects a driving connection between the input and output members. If there is any slippage between the input and output members, the cam actuator 58 will turn relative to the plate 55 and apply a further pressure on the main clutch elements until the slippage is stopped. When the solenoid 81 or the hydraulic piston 126 are actuated, the pilot clutch member 57 is moved out of engagement with the pilot clutch member 65. Since the assembly of the cam actuator 58, the spring 71 and the pilot clutch element 67 is relatively light in weight, the same can be decelerated rapidly so as to minimize wear between the armature 87 and the solenoid or piston. Moreover, since the cam actuator 58 and the parts attached thereto can be decelerated rapidly, the cam actuator does not tend to "over-run" the output member, when the pilot clutch is disengaged, and cause erratic re-engagement of the main clutch.

I claim:

1. A multiple disk clutch including a housing, input and output members disposed in the housing, first and second sets of coaxial main clutch elements respectively mounted on said input and output shafts for rotation therewith and for relative axial movement into and out of coacting engagement, clutch operating means mounted on said output member for rotation therewith and for axial movement relative thereto to press the clutch elements into coacting engagement, a force multiplying apparatus including a rotary cam member disposed coaxially of said clutch operating member and mounted for rotation relative to said driven member, annularly spaced balls disposed between said cam member and said clutch operating means for moving the latter axially in a direction to engage said clutch elements when the cam member is turned relative to said operating means in the direction of rotation of said input member, a pilot clutch including a first pilot clutch member on said input member and a second pilot clutch member, means non-rotatably mounting said second pilot clutch member on said cam member for axial movement relative thereto into and out of coacting engagement with said first clutch member, said mounting means including spring means interposed between said cam member and said second pilot clutch member for yieldably urging said second pilot clutch member in one direction into engagement with said first clutch member to normally effect engagement of the main clutch elements, and selectively operable means non-rotatably mounted on said housing for moving said second pilot clutch member in the other direction and for retarding rotation of said second pilot clutch member when the latter is moved in said other direction to effect disengagement of the main clutch elements.

2. A multiple disk clutch including a housing, input and output members disposed in the housing, first and second sets of coaxial main clutch elements respectively mounted on said input and output shafts for rotation therewith and for relative axial movement into and out of coacting engagement, clutch operating means mounted on said driven member for rotation therewith and for axial movement relative thereto to press the clutch elements into coacting engagement, a force multiplying apparatus including a rotary cam member disposed coaxially of said clutch operating member and mounted for rotation relative to said driven member, annularly spaced balls disposed between said cam member and said clutch operating means for moving the latter axially in a direction to engage said clutch elements when the cam member is turned relative to said operating means in the direction of rotation of said input member, a pilot clutch including a first pilot clutch member on said input member and a second pilot clutch member, said second pilot clutch member being disposed radially outwardly of said cam member and movable axially relative to said first clutch member into and out of coacting engagement therewith, an annular disk-shaped spring member attached to said cam member and said second pilot clutch member for non-rotatably mounting said second clutch member on said cam member and for yieldably urging the second clutch member axially in one direction relative thereto, and selectively operable means non-rotatably mounted on said housing for moving said second pilot clutch member in the other direction and for retarding rotation of said second pilot clutch member when the latter is moved in said other direction to effect disengagement of the main clutch elements.

3. A multiple disk clutch including a housing, input and output members disposed in the housing, first and second sets of coaxial main clutch elements respectively mounted on said input and output shafts for rotation therewith and for relative axial movement into and out of coacting engagement, clutch operating means mounted on said driven member for rotation therewith and for axial movement relative thereto to press the clutch elements into coacting engagement, a force multiplying apparatus including a rotary cam member disposed coaxially of said clutch operating member and mounted for rotation relative to said driven member, annularly spaced balls disposed between said cam member and said clutch operating means for moving the latter axially in a direction to engage said clutch elements when the cam member is turned relative to said operating means in the direction of rotation of said input member, a pilot clutch including a first pilot clutch member on said input member and a second pilot clutch member, an annular disk-shaped spring member attached to said cam member and to said second pilot clutch member for non-rotatably supporting said second pilot clutch member on said cam member and for yieldably urging said second clutch member axially in one direction into coacting engagement with said first clutch member, and selectively operable means non-rotatably mounted on said housing for moving said second clutch member in the other direction and for retarding rotation of said second pilot clutch member when the latter is moved in said other direction to effect disengagement of the main clutch elements.

4. The combination of claim 3 wherein said selectively operable means includes a stationary electro-magnet, and an armature attached to said second pilot clutch member for moving the latter away from the first clutch member when the electro-magnet is energized.

5. The combination of claim 3 wherein said selectively operable means includes an annular piston, and means on said piston engageable with said second pilot clutch member for moving the latter away from the first clutch member.

6. A multiple disk clutch including a housing, input and output members disposed in the housing, first and second sets of coaxial main clutch elements respectively mounted on said input and output shafts for rotation therewith and for relative axial movement into and out of coacting engagement, clutch operating means mounted on said driven member for rotation therewith and for axial movement relative thereto to press the clutch elements into coacting engagement, a force multiplying apparatus including a rotary cam member disposed coaxially of said clutch operating member and mounted for rotation relative to said driven member, annularly spaced balls disposed between said cam member and said clutch operating means for moving the latter axially in a direction to engage said clutch elements when the cam member is turned relative to said operating means in the direction of rotation of said input member, a pilot clutch including a first pilot clutch member on said input member and a second pilot clutch member, an annular disk spring member having an annular substantially flat inner portion attached to said cam member and an annular substantially flat outer portion normally axially offset from said inner portion and attached to said second pilot clutch member for non-rotatably supporting said second pilot clutch member on said cam member and for yieldably urging the second clutch member axially in one direction relative thereto, and selectively operable means non-rotatably mounted on said housing for moving said second clutch member in the other direction and for retarding rotation of said second pilot clutch member when the latter is moved in said other direction to effect disengagement of the main clutch elements.

7. The combination of claim 6 wherein said spring member has a plurality of spiral slots therein intermediate the radially inner and outer edges thereof.

8. A multiple disk clutch comprising a housing, an input member, having a first shaft portion and a first coaxial cage portion spaced radially outwardly of said shaft portion, an output member having a second tubular shaft portion and a second coaxial cage portion spaced radially outwardly of its shaft portion, first and second sets of clutch elements respectively carried by said first and second cage portions for rotation therewith and for relative axial movement into and out of coacting engagement, clutch operating means mounted on said driven member for rotation therewith and for axial movement relative thereto to press the clutch elements into coacting engagement, said operating means having a portion disposed internally of said second cage portion, a force multiplying apparatus including a rotary cam member disposed internally said second cage portion and around said second tubular shaft portion, annularly spaced balls disposed between said cam member and said portion of clutch operating means for moving the latter axially in a direction to engage said clutch elements when the cam member is turned relative to said operating means in the direction of rotation of said input member, and a pilot clutch means for selectively connecting and disconnecting said cam member to said input cage.

9. A multiple disk clutch comprising a housing, an input member, having a first shaft portion and a first coaxial cage portion spaced radially outwardly of said shaft portion, an output member having a second tubular shaft portion and a second coaxial cage portion spaced radially outwardly of its shaft portion, first and second sets of clutch elements respectively carried by said first and second cage portions for rotation therewith and for relative axial movement into and out of coacting engagement, clutch operating means mounted on said driven member for rotation therewith and for axial movement relative thereto to press the clutch elements into coacting engagement, said operating means having a portion disposed internally of said second cage portion, a force multiplying apparatus including a rotary cam member disposed internally said second cage portion and around said second tubular shaft portion, annularly spaced balls disposed between said cam member and said portion of clutch operating means for moving the latter axially in a direction to engage said clutch elements when the cam member is turned relative to said operating means in the direction of rotation of said input member, a pilot clutch including a first pilot clutch member on said input member and a second pilot clutch member, an annular disk-shaped spring member attached to said cam member and to said second pilot clutch member for non-rotatably supporting said second pilot clutch member on said cam member and for yieldably urging said second clutch member axially in one direction into coacting engagement with said first clutch member, and selectively operable means for moving said second clutch member in the other direction.

10. A multiple disk clutch comprising a housing defining a chamber, an input member including a first cage portion disposed in said chamber and open at one end and a first coaxial shaft portion, an output member including a second cage member disposed in said chamber internally of said first cage member and a second hollow shaft portion surrounding said first shaft portion, a first bearing means interposed between said first and second shaft portions, a second bearing means interposed between said second shaft portion and said housing for rotatably supporting the second shaft portion, first and second sets of clutch elements respectively carried by said first and second cage portions for rotation therewith and for relative axial movement into and out of coacting engagement, clutch operating means mounted on said driven member for rotation therewith and for axial movement relative thereto to press the clutch elements into coacting engagement, a force multiplying apparatus including a rotary cam member disposed around said second shaft portion and annularly spaced balls disposed between said cam member and said clutch operating means for moving the latter axially in a direction to engage said clutch elements when the cam member is turned relative to the operating means in the direction of rotation of said input member, thrust bearing means disposed externally of said second shaft portion engaging said cam member to limit axial movement thereof, pilot clutch means for selectively connecting and disconnecting said cam member from said input member, passage means in said housing communicating with said chamber adjacent said second bearing means for supplying lubricant to said chamber to lubricate said second bearing means, said thrust bearing and said ball members, and passage means in said second shaft portion communicating with said chamber for conveying lubricant to said first bearing means, said passage means in said second shaft portion extending in a direction crosswise thereof to produce a centrifugal pumping action when the output member is rotated to thereby reduce the flow of lubricating oil to the first bearing means when the clutch is engaged.

11. A multiple disk clutch including a housing, input and output members disposed in the housing, first and second sets of coaxial main clutch elements respectively mounted on said input and output shafts for rotation therewith and for relative axial movement into and out of coacting engagement, clutch operating means mounted on said driven member for rotation therewith and for axial movement relative thereto to press the clutch elements into coacting engagement, a force multiplying apparatus including a rotary cam member disposed coaxially of said clutch operating member and annularly spaced balls disposed between said cam member and said clutch operating means for moving the latter axially in a direction to engage said clutch elements when the cam member is turned relative to said operation means in the direction of rotation of said input member, a pilot clutch including a first pilot clutch member on said input member and a second pilot clutch member, means non-rotatably mounting said second pilot clutch member on said cam member for axial movement relative thereto into and out of coacting engagement with said first clutch member, said mounting means including means interposed between said cam member and said second clutch member for yieldably urging said second pilot clutch member axially in one direction relative to said cam member, an annular piston mounted on said housing for axial movement relative thereto, means for selectively applying fluid under pressure to said piston, and means on said piston engageable with said second pilot clutch member for moving the latter axially in the other direction relative to said cam member.

12. A multiple disk clutch including a housing, input and output members disposed in said housing, first and second sets of coaxial main clutch elements respectively mounted on said input and output members for rotation therewith and for rotative axial movement into and out of coacting engagement, a clutch operator mounted on said output member for rotation therewith and for axial movement relative thereto into engagement with said clutch elements to press the same into driving engagement, said operator including a portion having a continuous ball raceway disposed in a plane normal to the axis of the output member, a force multiplying apparatus including a rotary cam actuator having a plurality of arcuate cam grooves each inclined relative to said ball raceway, a plurality of balls disposed between said raceway and said cam grooves in said operator and said actuator respectively for moving said operator axially in a direction toward said clutch elements to engage said clutch when the cam actuator is turned relative to said operator in the normal direction of rotation of said input member, bearing means on said output member engageable with said actuator for rotatably supporting said actuator on said output member and for limiting axial movement of the actuator in a direction away from said clutch elements, stop means on said output member for engaging said operator to limit axial movement of the operator in a direction away from said clutch elements and toward said actuator when the clutch is disengaged, a pilot clutch including a first pilot clutch member on said input member and a second pilot clutch member non-rotatably connected to said actuator, and means non-rotatably mounted on said housing for selectively moving said second pilot clutch member out of engagement with said first pilot clutch member and for retarding rotation of said second pilot clutch member when the latter is moved out of engagement with said first pilot clutch member to disengage said disk clutch.

References Cited in the file of this patent

UNITED STATES PATENTS

| | | |
|---|---|---|
| 2,020,637 | Fawick | Nov. 12, 1935 |
| 2,091,270 | Colman | Aug. 31, 1937 |
| 2,407,757 | MacCallum | Sept. 17, 1946 |
| 2,649,941 | Doebeli | Aug. 25, 1953 |
| 2,825,434 | Smitzer | Mar. 4, 1958 |
| 2,850,131 | Maurice et al. | Sept. 2, 1958 |